(12) United States Patent
Kim et al.

(10) Patent No.: US 10,733,702 B2
(45) Date of Patent: Aug. 4, 2020

(54) DISPLAY DEVICE AND METHOD OF DRIVING THE SAME

(71) Applicant: Samsung Display Co., Ltd., Yongin-si, Gyeonggi-do (KR)

(72) Inventors: Jae Shin Kim, Seoul (KR); Seungho Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 69 days.

(21) Appl. No.: 15/917,475

(22) Filed: Mar. 9, 2018

(65) Prior Publication Data
US 2019/0026861 A1 Jan. 24, 2019

(30) Foreign Application Priority Data
Jul. 20, 2017 (KR) .................. 10-2017-0091899

(51) Int. Cl.
*G06T 3/40* (2006.01)
*G09G 3/3208* (2016.01)

(52) U.S. Cl.
CPC .............. *G06T 3/4007* (2013.01); *G06T 3/40* (2013.01); *G09G 3/3208* (2013.01);
(Continued)

(58) Field of Classification Search
CPC ..... G06T 3/4007; G06T 3/40; G06T 2210/22; G06T 7/74; G09G 2320/04; G09G 2320/0257; G09G 3/3208; G09G 2320/0285; G09G 2320/045; G09G 2340/04; G09G 2320/0613; H04L 67/2842; H04L 65/1069; H04L 67/306; H04L 67/34; G06F 2203/04806; G06F 3/0236; G06F 3/0679; G06F 3/0604; G06F 3/0605
See application file for complete search history.

(56) References Cited

U.S. PATENT DOCUMENTS

2006/0071892 A1* 4/2006 Sakaguchi ........... G09G 3/3648
345/89
2006/0109363 A1* 5/2006 Eun ....................... H04N 1/047
348/311
(Continued)

FOREIGN PATENT DOCUMENTS

KR 10-2012-0094736 A 8/2012
KR 10-2015-0080214 A 7/2015
(Continued)

*Primary Examiner* — Xilin Guo
(74) *Attorney, Agent, or Firm* — Lewis Roca Rothgerber Christie LLP (57) ABSTRACT

A display device includes a display panel including a display panel including a plurality of pixels, a memory device configured to store pre-scaling data and compensation data, and a panel driver configured to generate first image data by performing a pre-scaling operation on input image data based on the pre-scaling data, generate second image data by performing a compensation operation on the input image data based on the compensation data, and provide a driving signal to the pixels to display a pre-scaled image corresponding to the first image data, or to display a compensated image corresponding to the second image data, wherein the pre-scaling operation is performed before the compensation operation is performed.

20 Claims, 9 Drawing Sheets

(52) U.S. Cl.
CPC ............... *G09G 2320/0257* (2013.01); *G09G 2320/0285* (2013.01); *G09G 2320/045* (2013.01); *G09G 2340/04* (2013.01)

(56) References Cited

U.S. PATENT DOCUMENTS

| | | | | |
|---|---|---|---|---|
| 2008/0205777 | A1* | 8/2008 | Chung | ................. H04N 19/186 |
| | | | | 382/233 |
| 2011/0273439 | A1* | 11/2011 | Son | ........................ G09G 3/003 |
| | | | | 345/419 |
| 2014/0043318 | A1* | 2/2014 | Choo | ........................ G09G 5/00 |
| | | | | 345/214 |
| 2014/0375694 | A1* | 12/2014 | Ohba | ........................ G06T 3/40 |
| | | | | 345/660 |
| 2018/0295375 | A1* | 10/2018 | Ratner | ................. H04N 19/436 |

FOREIGN PATENT DOCUMENTS

| | | |
|---|---|---|
| KR | 10-2015-0082807 A | 7/2015 |
| KR | 10-2016-0083179 A | 7/2016 |

\* cited by examiner

DISPLAY DEVICE AND METHOD OF DRIVING THE SAME

CROSS REFERENCE TO RELATED APPLICATION

This application claims priority to, and the benefit of, Korean patent Application No. 10-2017-0091899 filed on Jul. 20, 2017, the disclosure of which is hereby incorporated by reference herein in its entirety.

BACKGROUND

1. Technical Field

Embodiments of the inventive concept relate to display devices, and a method of driving a display device.

2. Description of the Related Art

An organic light emitting diode (OLED) includes an organic layer between two electrodes, namely, between an anode and a cathode. Positive holes from the anode are combined with electrons from the cathode in the organic layer between the anode and the cathode to emit light. The OLED has a variety of aspects, such as a wide viewing angle, a rapid response speed, relatively thin thickness, and low power consumption.

As time passes, a pixel having the OLED is deteriorated according to an amount of the driving time of the pixel and an amount of the driving current. When the pixel is deteriorated, a luminance of the pixel may be decreased. Accordingly, the display quality may be decreased, and afterimage may occur due to the pixel deterioration.

To improve the display quality by compensating the pixel deterioration, a variety of methods of compensating the pixel deterioration have been developed, such as determining a compensation amount(s) for the pixel(s) based on a driving amount or usage time of the pixel(s). However, in a high-resolution display device, a relatively large memory capacity is required to store compensation data for compensating the pixel deterioration as the number of pixels increases. Further, it may take a relatively long time to load the compensation data for performing the compensating operation at the initialization of the display device.

SUMMARY

Embodiments provide a display device capable of improving the display quality, and a method of driving the display device.

According to some embodiments, a display device may include a display panel including a display panel including a plurality of pixels, a memory device configured to store pre-scaling data and compensation data, and a panel driver configured to generate first image data by performing a pre-scaling operation on input image data based on the pre-scaling data, generate second image data by performing a compensation operation on the input image data based on the compensation data, and provide a driving signal to the pixels to display a pre-scaled image corresponding to the first image data, or to display a compensated image corresponding to the second image data, wherein the pre-scaling operation is performed before the compensation operation is performed.

The compensation data may be generated based on accumulated data generated by accumulatively storing the input image data, and the pre-scaling data may be generated based on the compensation data.

The pre-scaling data may be set to an average value of the compensation data.

The pre-scaling data may be set to a maximum value of the compensation data or to a minimum value of the compensation data.

The pre-scaling operation may load a pre-scaling factor for all of the pixels as the pre-scaling data, and may apply the pre-scaling factor to the input image data to generate the first image data.

The compensation operation may load a plurality of compensation factors for the pixels as the compensation data, and applies the compensation factors to the input image data for each of the pixels, respectively, to generate the second image data.

The panel driver may be configured to drive the display panel based on the first image data until the compensation factors are loaded, and drive the display panel based on the second image data after the compensation factors are loaded.

The panel driver may be configured to perform a transition operation for determining third image data corresponding to values between the first image data and the second image data, and a transition image corresponding to the third image data may be displayed during a transition period between a first period during which the pre-scaled image is displayed and a second period during which the compensated image is displayed.

The third image data may be gradually changed from the first image data to the second image data during the transition period.

A time length of the transition period may increase as a difference between the first image data and the second image data increases.

The pre-scaling operation may load a plurality of pre-scaling factors for each of a plurality of pre-scaling pixel groups including respective ones of the pixels as the pre-scaling data, and applies the pre-scaling factors to the input image data for each of the pre-scaling pixel groups, respectively, to generate the first image data.

The compensation operation may load a plurality of compensation factors for each of a plurality of compensation pixel groups including respective ones of the pixels as the compensation data, and applies the compensation factors to the input image data for each of the compensation pixel groups, respectively, to generate the second image data.

A first number of the pixels of one of the pre-scaling pixel groups may be larger than a second number of the pixels of one of the compensation pixel groups.

The first image data may be generated by performing an interpolation operation on the pre-scaling factors at a boundary of the pre-scaling pixel group.

When the compensation data are updated, the pre-scaling data may be updated based on the updated compensation data.

According to some embodiments, a method of driving a display device, the display device including a memory device for storing pre-scaling data and compensation data, the method including performing a pre-scaling operation for input image data based on the pre-scaling data to generate first image data, displaying a pre-scaled image corresponding to the first image data, performing a compensation operation for the input image data based on the compensation data to generate second image data, and displaying a compensated image corresponding to the second image data.

The compensation data may be generated based on accumulated data generated by accumulatively storing the input image data, and the pre-scaling data may be generated based on the compensation data.

The pre-scaling data may be set to an average value of the compensation data.

The method may further include performing a transition operation for determining third image data between the first image data and the second image data, and displaying a transition image corresponding to the third image data during a transition period between a first period during which the pre-scaled image is displayed and a second period during which the compensated image is displayed.

The method may further include gradually changing the third image data from the first image data to the second image data during the transition period.

Therefore, a display device according to embodiments disclosed herein can prevent a flicker phenomenon due to loading delay or loading error of the compensation data because the pre-scaling operation for the entire display panel may be performed using a single pre-scaling factor before the compensation operation is performed.

In addition, a method of driving a display device according to embodiments disclosed herein can reduce a load of the display device during an initialization period of the display device, and can improve the display quality.

BRIEF DESCRIPTION OF THE DRAWINGS

Embodiments will be described more fully hereinafter with reference to the accompanying drawings, in which various embodiments are shown, and wherein.

DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
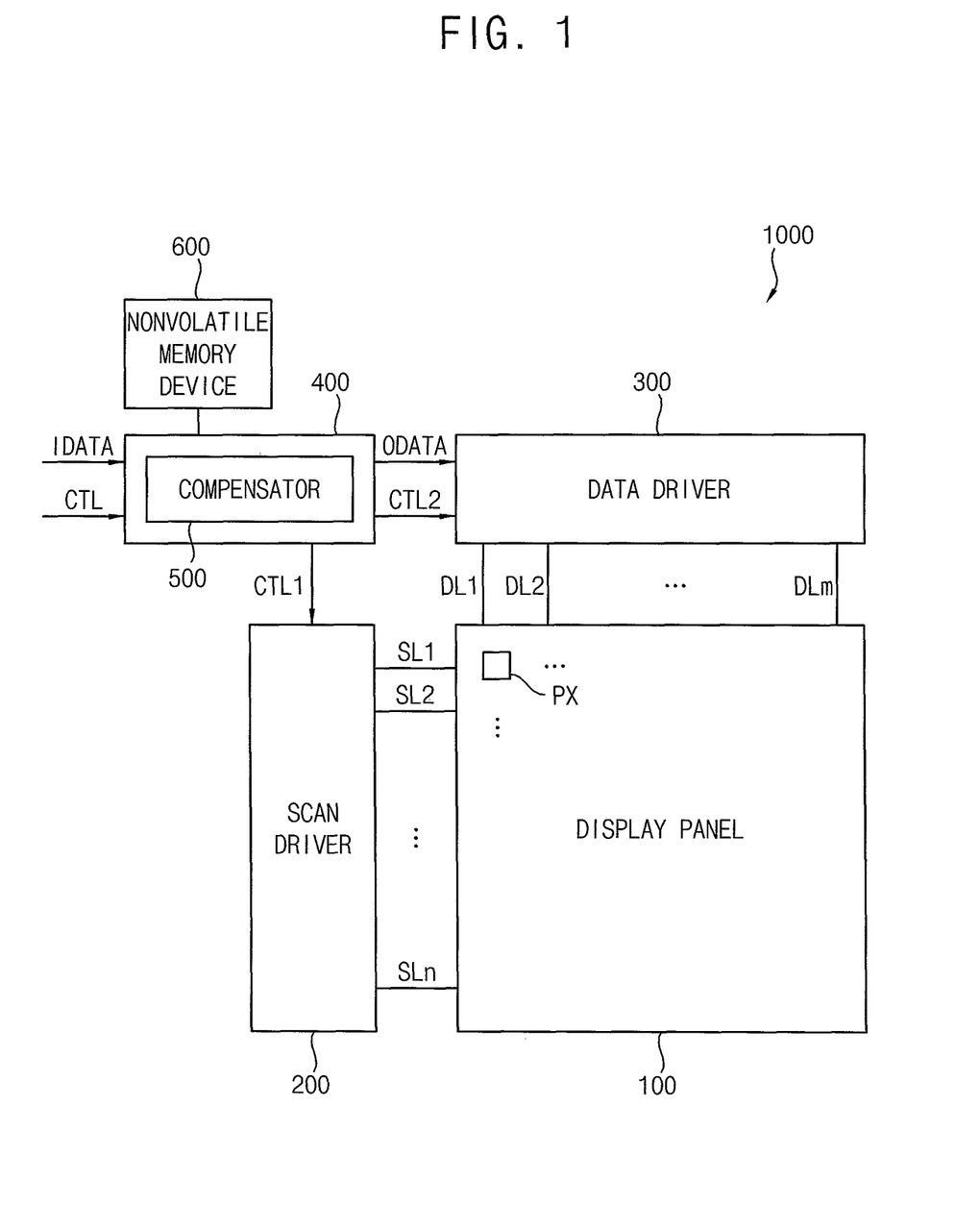
FIG. 1 is a block diagram illustrating a display device according to embodiments.

FIG. 1 is a block diagram illustrating a display device according to embodiments.

Referring to FIG. 1, the display device may include a display panel 100, a panel driver, and a non-volatile memory device 600. In one embodiment, the panel driver may include a scan driver 200, a data driver 300, a controller 400, and a compensator 500. Although the embodiments of FIG. 1 describe that the compensator 500 as included in the controller 400, it is not limited thereto. For example, the compensator 500 may be located outside the controller.

The display panel 100 may include a plurality of pixels PX to display an image. The display panel 100 may be connected to the scan driver 200 via a plurality of scan lines SL1 through SLn. The display panel 100 may be connected to the data driver 300 via a plurality of data lines DL1 through DLm. The display panel 100 may include n*m pixels PX located at respective crossing regions of the scan lines SL1 to SLn and the data lines DL1 to DLm.

The scan driver 200 may provide a scan signal to the pixels PX via the scan lines SL1 through SLn based on a first control signal CTL1.

The data driver 300 may provide a data signal to the pixels PX via the data lines DL1 through DLm based on a second control signal CTL2 and the output image data ODATA.

The controller 400 may control the scan driver 200 and the data driver 300. The controller 400 may receive the input image data IDATA and a control signal CTL from an external device (e.g., a system board). The controller 400 may generate the first and second control signals CTL1, CTL2 to control the scan driver 200 and the data driver 300, respectively. For example, the first control signal CTL1 for controlling the scan driver 200 may include a vertical start signal, a scan clock signal, etc. The second control signal CTL2 for controlling the data driver 300 may include a horizontal start signal, a load signal, etc. The compensator 500 may convert the input image data IDATA into output image data ODATA, and may provide the output image data ODATA to the data driver 300.

To generate the output image data ODATA, the compensator 500 may perform a pre-scaling operation for the input image data IDATA based on pre-scaling data, or may perform a compensation operation for the input image data IDATA based on compensation data. Thus, the compensator 500 may perform the pre-scaling operation for the entire display panel 100 (or each of a plurality of pre-scaling pixel groups) using a single pre-scaling data (e.g., a pre-scaling factor) before performing the compensation operation. Here, the compensation operation indicates an operation for preventing strain or afterimage, such as a deviation compensation operation for compensating a deviation between pixels owing to a process deviation, a deterioration compensation operation for compensating pixel degradation owing to degradation of pixels, etc. Hereinafter, the compensation operation will be described based on the deterioration compensation operation of the pixels. The pre-scaling operation indicates a temporal compensation operation in which the pre-scaling data having a relatively small size is loaded to adjust image data of all of the pixels. Therefore, even if the compensation operation is delayed due to a loading delay of the compensation data, a flicker due to the loading delay or loading error of the compensation data can be reduced or prevented by adjusting the luminance of the entire display panel by the pre-scaling operation. Hereinafter, a structure and operations of the compensator 500 will be described in more detail with reference to FIGS. 2, 5, and 7.

The non-volatile memory device 600 may store the pre-scaling data and the compensation data. Here, the pre-scaling data is for performing the pre-scaling operation, and includes a pre-scaling factor applied to the entire display panel (or includes a few pre-scaling factors respectively applied to each pre-scaling pixel group). The compensation data is for performing the compensation operation (e.g., the deviation compensation operation for compensating a deviation between pixels owing to a process deviation, the deterioration compensation operation for compensating a pixel degradation owing to degradation of pixels) and includes a plurality of compensation factors applied to each pixel (or to each of a plurality of compensation pixel groups). Therefore, in the non-volatile memory device 600, the space in which the pre-scaling data is stored may be allocated a relatively very small size (for example, several to several tens of bytes), and the space in which the compensation data is stored may be allocated a relatively large size (for example, tens of megabytes).

The non-volatile memory device 600 can preserve data even when the power is not supplied. Further, the non-volatile memory device 600 may be relatively inexpensive, and may store a large capacity. For example, the non-volatile memory device 600 may include a flash memory device, an erasable programmable read-only memory (EPROM) device, an electrically erasable programmable read-only memory (EEPROM) device, a phase change random access memory (PRAM) device, a resistance random access memory (RRAM) device, etc.

Therefore, the display device 1000 may perform the pre-scaling operation using a single pre-scaling factor for an entire display panel (or a few pre-scaling factors for each pre-scaling pixel group) before performing the compensating operation. Accordingly, the display device 1000 can reduce or prevent the flicker phenomenon otherwise caused due to the loading delay or the loading error of the compensation data by adjusting the overall luminance and color coordinates of the display panel before performing the detailed compensation operation for each of the pixels.

Figure 2:
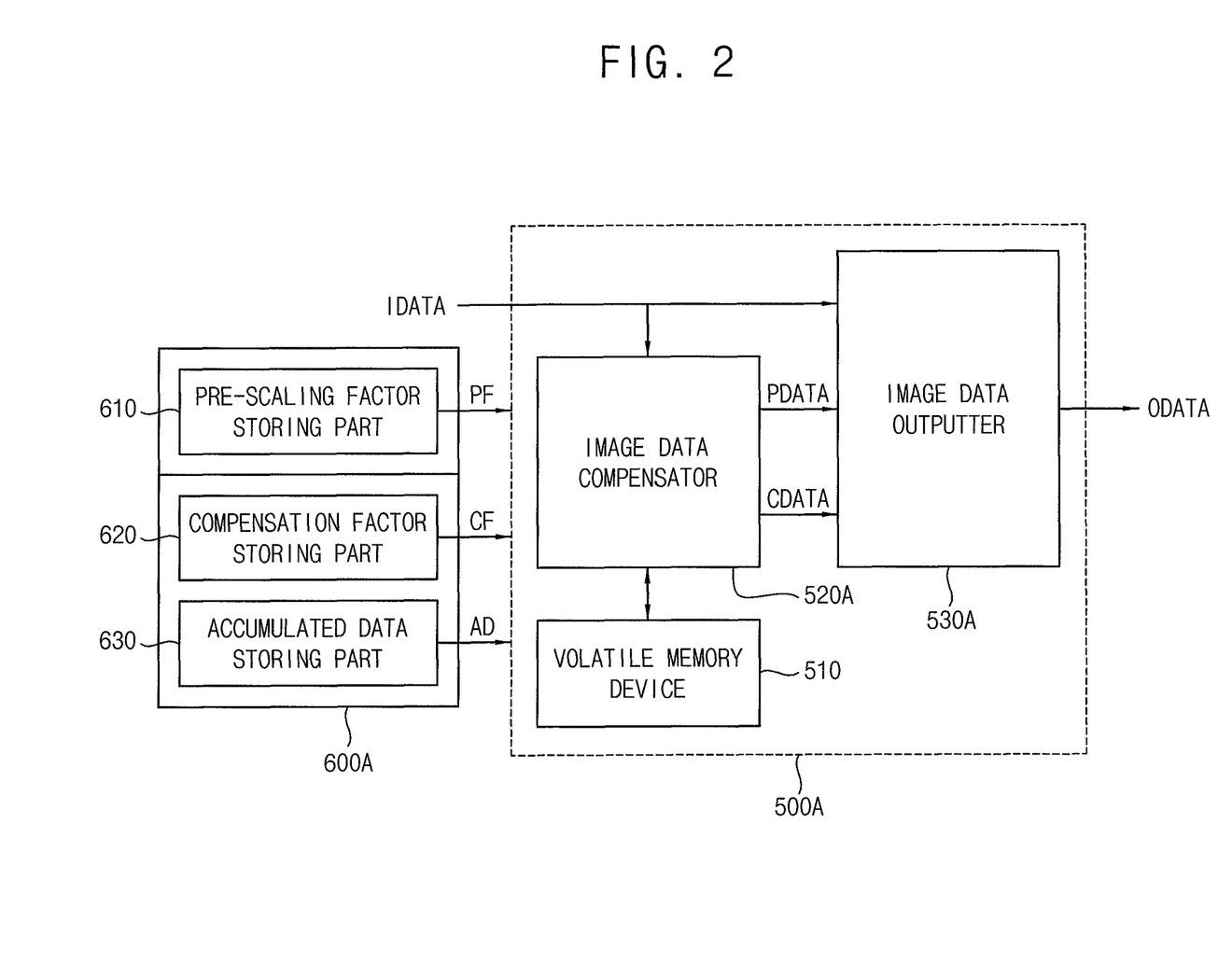
FIG. 2 is a diagram illustrating one example of a compensator and a non-volatile memory device included in the display device of FIG. 1.

FIG. 2 is a diagram illustrating one example of a compensator and a non-volatile memory device included in the display device of FIG. 1.

Referring to FIG. 2, the non-volatile memory device 600A may include a pre-scaling factor storing part 610, a compensation factor storing part 620, and an accumulated data storing part 630. The pre-scaling data may be stored in the pre-scaling factor storing part 610. The compensation data (e.g., compensation factors CF, accumulated data AD) may be stored (e.g., respectively stored) in the compensation factor storing part 620 and the accumulated data storing part 630. Because the non-volatile memory device 600A is slower than a volatile memory device 510, it may be difficult to directly access the non-volatile memory device 600A to perform the compensating operation while the display panel is driven. The display device 1000 may load the compensation factors CF and the accumulated data AD from the non-volatile memory device 600A into the volatile memory device 510. The display device 1000 may compensate the input image data IDATA using the compensation factors CF stored in the volatile memory device 510, and may update the accumulated data AD and compensation factors CF.

Specifically, the pre-scaling factor PF may be stored in the pre-scaling factor storing part 610. Here, the pre-scaling factor PF may be for performing a pre-scaling operation (e.g., a temporal compensation operation) for all pixels (or for each pre-scaling pixel group) before performing the compensating operation for each pixel. The pre-scaling factor PF may be generated based on the compensation factors CF. In one embodiment, the pre-scaling factor PF may be set to an average value of the compensation factors CF. In this case, because a luminance of a pre-scaled image by the pre-scaling operation may be similar to a luminance of the compensated image by the compensation operation, the flicker phenomenon can be efficiently decreased or prevented. In another embodiment, the pre-scaling factor PF may be set to a maximum value of the compensation factors CF or to a minimum value of the compensation factors CF. When the pre-scaling factor PF corresponds to the maximum value of the compensation factors CF, the luminance of the pre-scaled image by the pre-scaling operation may be adjusted in a relatively small range, and a luminance degradation of the pre-scaled image may be relatively low. On the other hand, when the pre-scaling factor PF corresponds to the minimum value of the compensation factors CF, the luminance of the pre-scaled image by the pre-scaling operation is relatively largely adjusted, and a correction margin can be ensured.

The compensation factors CF may be stored in the compensation factor storing part 620. In one embodiment, the compensation factors CF may be for compensating pixel degradation for each of the pixels (or for each of the compensating pixel groups). The compensation factors CF may be derived from the accumulated data AD. In one example, the compensation factors CF corresponding to the accumulated data AD may be derived using a look-up table that stores a relationship between the accumulated data AD and the compensation factors CF. In another example, the compensation factors CF can be derived from the accumulated data AD using a function or a formula for converting the accumulated data AD into the compensation factor CF.

The accumulated data AD may be stored in the accumulated data storing part 630. The accumulated data AD may be generated by accumulatively storing the input image data IDATA for each pixel (or for each compensation pixel group). In one embodiment, when the compensation data that is stored in the accumulated data storing part 630 are updated, the pre-scaling data that is stored in the pre-scaling factor storing part 610 may be updated based on the updated compensation data.

The compensator 500A may include a volatile memory device 510, an image data compensator 520A, and an image data outputter 530A.

The compensation factors CF and the accumulated data AD may be loaded from the non-volatile memory device 600A to the volatile memory device 510 while the display device 1000 is initialized. The volatile memory device 510 may not preserve the stored data when the power is not supplied, however the volatile memory device 510 can process the data at a relatively high speed. For example, the volatile memory device 510 may include a dynamic random access memory (DRAM), a static random access memory (SRAM), a mobile DRAM, etc. Therefore, the input image data may be accumulatively stored in the volatile memory device 510 while the display panel 100 is being driven. In addition, the data in the compensation factor storing part 620 and the accumulated data storing part 630 may be updated based on the accumulated data in the volatile memory device 510 when an event occurs (e.g., a pre-determined event, such as at every one hour, at the time of turn-off, etc.).

The image data compensator 520A may load the pre-scaling factor PF to perform the pre-scaling operation based on the pre-scaling factor PF before the compensation factors CF are loaded. In one embodiment, the image data compensator 520A may load the pre-scaling factor PF as the pre-scaling data from the non-volatile memory device 600A, and may generate first image data PDATA by multiplying the input image data IDATA for all of the pixels by the pre-scaling factor PF.

In another embodiment, the image data compensator 520A may load pre-scaling factors PF corresponding to each of the pre-scaling pixel groups from the non-volatile memory device 600A, and may generate first image data PDATA by multiplying the input image data IDATA corresponding to each of the pre-scaling pixel groups by the corresponding pre-scaling factor PF. Thus, when the difference between the compensation data according to the position of the display panel 100 is relatively large, the pixels included in the display panel 100 are divided into a plurality of pre-scaling pixel groups (for example, the display panel 100 is divided into 16 pre-scaling pixel groups), and then the pre-scaling operation for each of the pre-scaling pixel groups may be performed. In this case, the first image data PDATA corresponding to the boundary of the pre-scaling pixel groups may be generated by an interpolation method of the pre-scaling factors PF.

In addition, the image data compensator 520A may perform the compensation operation based on the compensation factors CF after the compensation factors CF are loaded. In one embodiment, the image data compensator 520A may load the plurality of compensation factors CF corresponding to each of the pixels as the compensation data from the non-volatile memory device 600A, and may generate second image data CDATA by multiplying the input image data IDATA corresponding to each of the pixels by the corresponding compensation factor CF. In another embodiment, the image data compensator 520A may load the plurality of compensation factors CF corresponding to each of the compensation pixel groups as the compensation data from the non-volatile memory device 600A, and may generate second image data CDATA by multiplying the input image data IDATA corresponding to each of the compensation pixel groups by the corresponding compensation factor CF. Thus, to perform the compensation for individual pixels, excessively large compensation data may be required and the overall load of the display device may be increased. Therefore, the required capacity of the volatile memory device 510 and the load of the display device 1000 may be reduced by performing a compensation operation for each compensation pixel group including a plurality of pixels (e.g., each compensation pixel group including four pixels of a 2*2 matrix), instead of performing the compensation operation for each pixel. The first number (e.g., 1920*1080/16=129600) of the pixels included in one pre-scaling pixel group may be larger than a second number (e.g., 2*2=4) of the pixels included in one compensation pixel group.

The image data outputter 530A may output the output image data ODATA based on the input image data IDATA, the first image data PDATA, and the second image data CDATA. For example, the output image data ODATA may be output based on the first image data PDATA until a loading of the compensation factors CF is completed after the pre-scaling factor PF is loaded. The output image data ODATA may be output based on the second image data CDATA after the loading of the compensation factors CF is completed. The output image data ODATA may be output based on the input image data IDATA when the pre-scaling factor PF and the compensation factor CF are not loaded (e.g., in the case of error in the non-volatile memory device 600A).

Figure 3A:
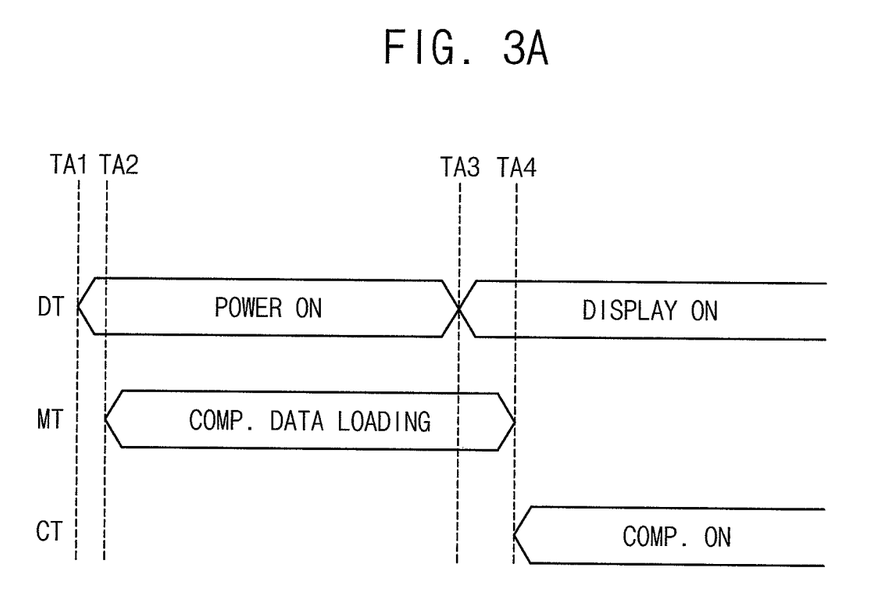
FIGS. 3A, 3B, and 4 are diagrams for describing operations and aspects of the compensator and the non-volatile memory device of FIG. 2.
Figure 3B:
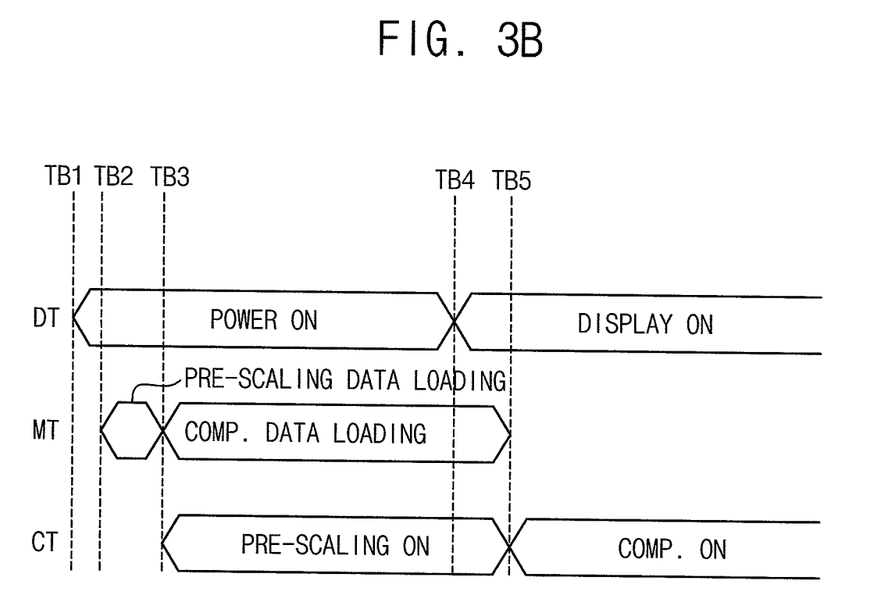
Figure 4:
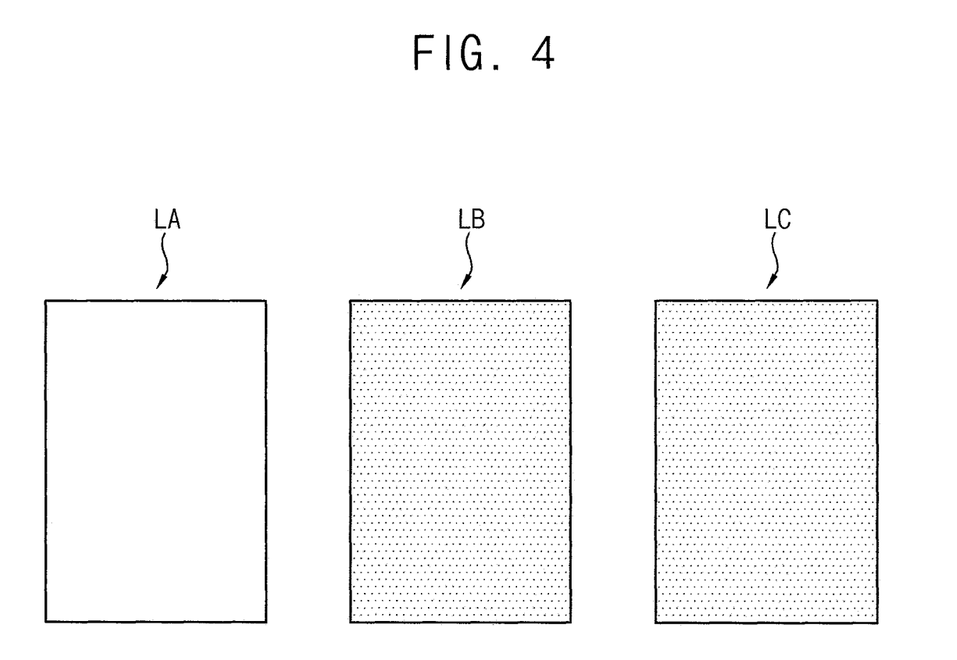

FIGS. 3A, 3B, and 4 are diagrams for describing operations and aspects of the compensator and the non-volatile memory device of FIG. 2.

Referring to FIGS. 3A, 3B, and 4, the display device according to the present embodiment may perform the pre-scaling operation prior to the compensation operation, thereby preventing the flicker phenomenon caused by the loading delay of the compensation data.

As shown in FIG. 3A, in one comparative embodiment, the flicker phenomenon may occur in the comparative display device due to a loading delay of the compensation data. Specifically, at a first time point TA1 of the drive timeline DT, the power may start to be supplied to the display device, and then initialization operations for driving the display device may be performed. For example, the controller may receive the power from the power supply, and may perform the initialization operations, such as loading the initialization data. At the second time point TA2 of the memory time line MT, the compensation data may start to be loaded from the non-volatile memory. Because the compensation data may have a relatively large size (e.g., about 24 megabytes), the loading time of the compensation data may be delayed. At the third time point TA3 of the drive timeline DT, the initialization operations are completed, and the image may start to be displayed. However, because the loading of the compensation data has not been completed at the third time point TA3 of the memory time line MT, the compensation operation cannot be performed. At the fourth time point TA4 of the memory time line MT, the loading of the compensation data may be completed, and then the compensation operation may start to be performed at the fourth time point TA4 of the compensation time line CT. The flicker may be recognized by the user because the compensation operation is suddenly applied at the fourth time point TA4. If the image does not display until the compensation data loading is completed in order that the flicker is not recognized by the user, there may arise a problem that the entire boot time or initialization time of the display device is delayed.

On the other hand, as shown in FIG. 3B, in the present embodiment, the display device may perform the pre-scaling operation before performing the compensation operation to prevent the flicker. Specifically, at the first time point TB1, the power may start to be supplied to the display device 1000, and then initialization operations for driving the display device 1000 may be performed. At the second time point TB2, the pre-scaling data may start to be loaded from the non-volatile memory device 600. Because the pre-scaling data may have a relatively small size (e.g., about 8 bytes), the pre-scaling data may be loaded in a short time. At the third time point TB3, the loading of the pre-scaling data is completed, and the pre-scaling operation may start to be performed. Also, at the third time point TB3, the compensation data may start to be loaded from the non-volatile memory device 600. At the fourth time point TB4, the initialization operations are completed, and the image may start to be displayed. Because the loading of the compensation data is not completed at the fourth time point TB4, and because the pre-scaling operation is continuously performed, the pre-scaled image can be displayed. At the fifth time point TB5, the loading of the compensation data is completed, and the compensation operation may start to be performed. Although the pre-scaled image is changed to the compensated image at the fifth time point TB5, the flicker may not be recognized by the user because the pre-scaling operation is roughly applied to the input image data as a temporal compensation operation.

As shown in FIG. 4, to verify the effect of the present embodiment, sample display devices LA, LB, and LC displayed 40 sample images for measuring the pixel deterioration for 3000 hours, and then displayed a full white image. The average luminance of the display device LA in which the pre-scaling operation and the compensation operation were not performed was measured to be about 400 nits. The average luminance of the display device LB in which the pre-scaling operation was performed was measured to be about 370.4 nits. Also, the average luminance of the display device LC in which the compensation operation was performed was measured to be about 370.1 nits. Thus, a first difference between (i.e., 370.4 nit−370.1 nit=0.3 nit) the luminance of the display device LB in which the pre-scaling operation was performed and the luminance of the display device LC in which the compensation operation was performed is significantly smaller then a second difference between (400 nit−370.1 nit=29.9 nit) the luminance of the display apparatus LA in which the pre-scaling operation and the compensation operation were not performed and the luminance of the display apparatus LC in which the compensation operation was performed. The comparative display device had a FMA (Flicker Modulation Amplitude) value of 0.075%. The display device according to an example of the present embodiment had a FMA value of 0.001%. Here, FMA is for evaluating the flicker level, and can be calculated according to Equation 1.

$$FMA=(MAX\_LUM-MIN\_LUM)/MAX\_LUM \qquad \text{Equation 1}$$

where MAX_NUM indicates the maximum value of luminance, and MIN_NUM indicates the minimum value of luminance.

Figure 5:
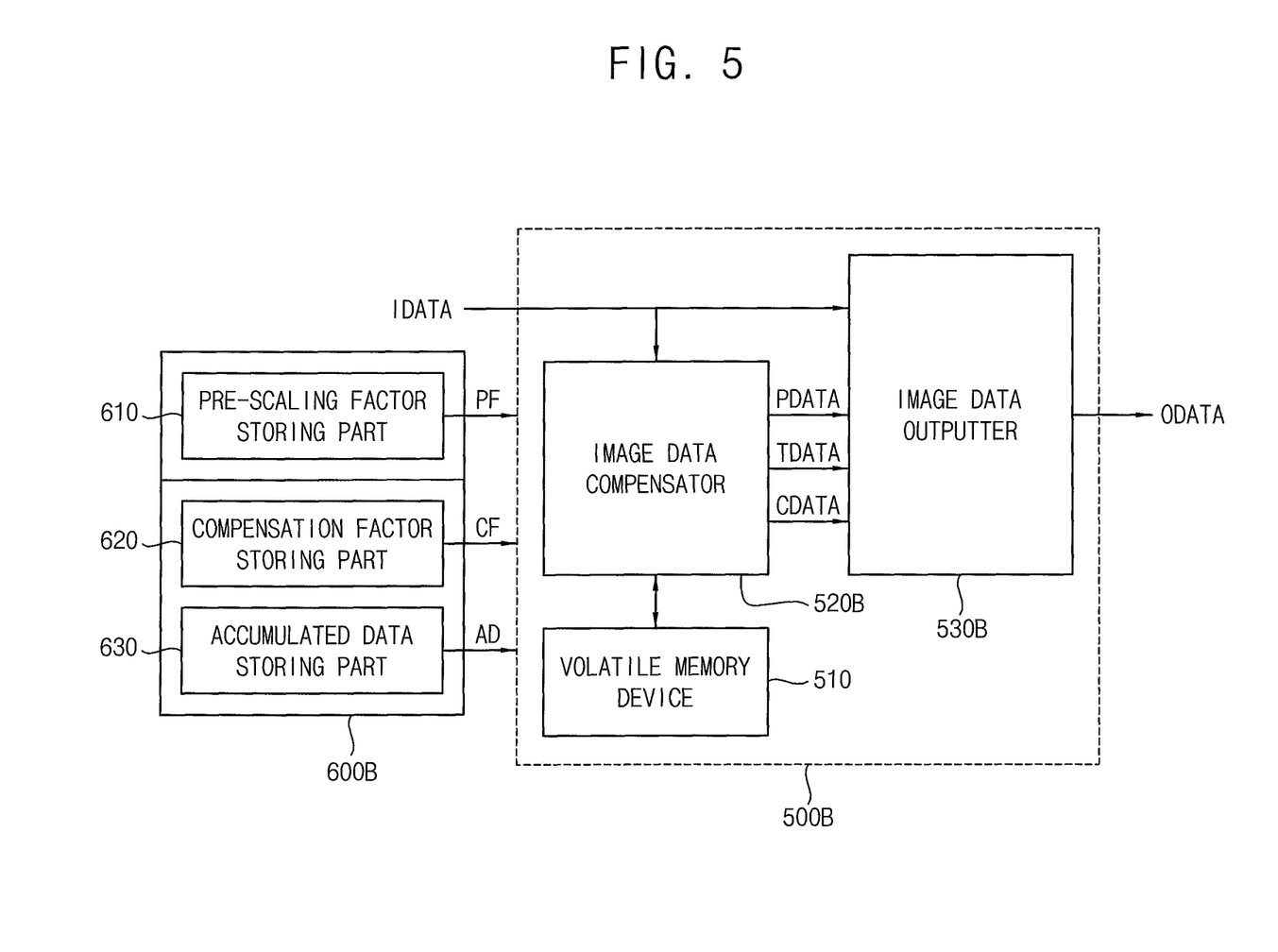
FIG. 5 is a diagram illustrating another example of a compensator and a non-volatile memory device included in the display device of FIG. 1.

FIG. 5 is a diagram illustrating another example of a compensator and a non-volatile memory device included in the display device of FIG. 1.

Referring to FIG. 5, the non-volatile memory device 600B may include a pre-scaling factor storing part 610, a compensation factor storing part 620, and an accumulated data storing part 630. The pre-scaling data may be stored in the pre-scaling factor storing part 610. The compensation data may be stored in the compensation factor storing part 620 and the accumulated data storing part 630. The compensator 500B may include a volatile memory device 510, an image data compensator 520B, and an image data outputter 530B. The compensator 500B and the non-volatile memory device 600B according to the present embodiment are substantially the same as the compensator 500A and the non-volatile memory device 600A of the embodiment described in FIG. 2, except that the image data compensator 520B further performs a transition operation. Therefore, the same or like reference numerals will be used to refer to the same or like parts as those described in the previous embodiment of FIG. 2, and any repetitive explanation concerning the above elements will be omitted.

The image data compensator 520B may load the pre-scaling factor PF to perform the pre-scaling operation based on the pre-scaling factor PF before the compensation factors CF are loaded.

The image data compensator 520B may perform the transition operation during a transition period after the loading of the compensation factors CF is completed. Here, the transition operation indicates an operation for displaying an intermediate image (e.g., the transition image) between the pre-scaled image by the pre-scaling operation and the compensated image by the compensation operation. When a difference between the pre-scaled image and the compensated image is relatively large, the flicker may be recognized by the user despite performing the pre-scaling operation. Therefore, the flicker phenomenon may be reduced or prevented by displaying the transition image for gradually changing from the pre-scaled image to the compensated image by the transition operation. Therefore, the image data compensator 520B may determine the third image data TDATA between the first image data PDATA and the second image data CDATA to perform the transition operation. In one embodiment, the third image data TDATA may be gradually changed from the first image data PDATA to the second image data CDATA during the transition period in which the transition operation is performed. For example, the third image data TDATA may be calculated according to Equation 2.

$$TDATA=PDATA+K(CDATA-PDATA) \qquad \text{Equation 2}$$

where TDATA indicates the third image data, PDATA indicates the first image data, CDATA indicates the second image data, K is a variable that varies from 0 to 1. For example, K may gradually increase from 0 to 1 in a first time interval. In one example, the first time interval may be a fixed interval. In another example, the first time interval may be increased as a difference between the second image data and the first image data (i.e., CDATA−PDATA) increases. Also, a time length of the transition period in which the transition operation is performed may be increased as the difference between the second image data and the first image data increases.

In addition, the image data compensator 520B may perform the compensation operation based on the compensation factors CF after the transition period is over.

The image data outputter 530B may output the output image data ODATA based on the input image data IDATA, the first image data PDATA, the second image data CDATA, and the third image data TDATA. For example, the output image data ODATA may be output based on the first image data PDATA after the pre-scaling factor PF is loaded. The output image data ODATA may be output based on the third image data TDATA during the transition period after the compensation factors CF are loaded. The output image data ODATA may be output based on the second image data CDATA after the transition period is over.

Figure 6:
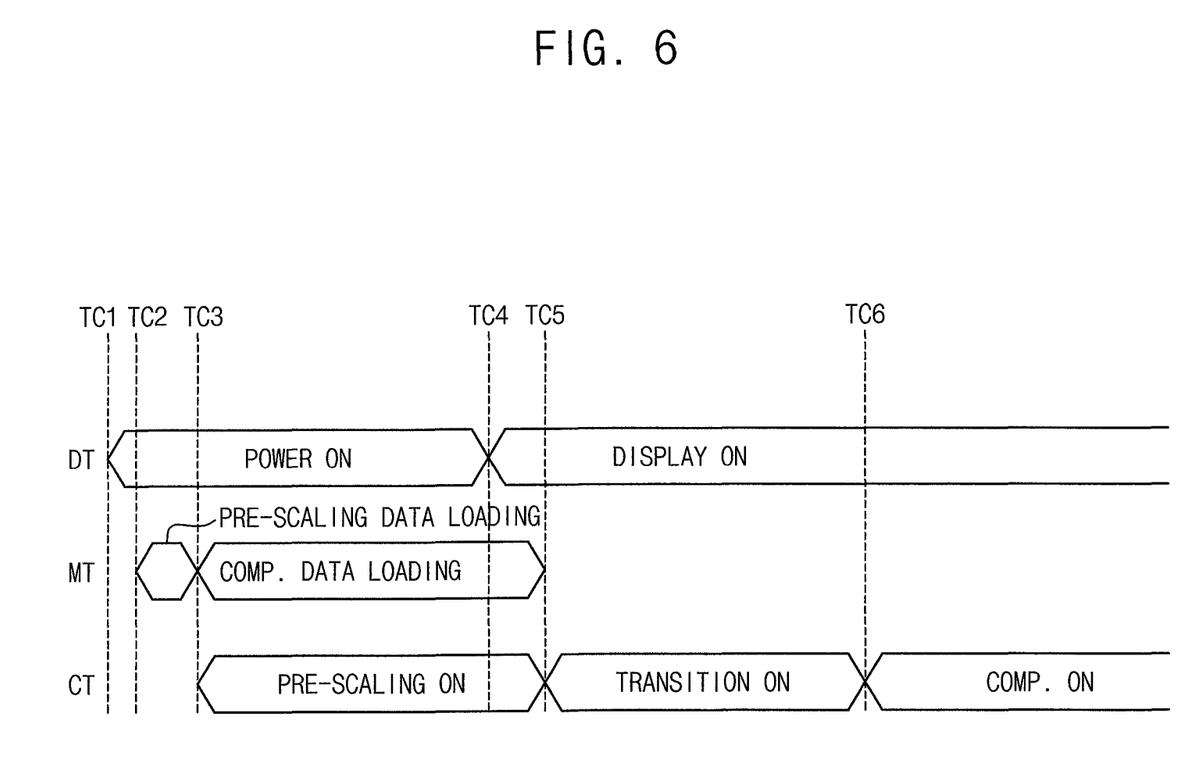
FIG. 6 is a diagram for describing operations and aspects of the compensator and the non-volatile memory device of FIG. 5.

FIG. 6 is a diagram for describing operations and aspects of the compensator and the non-volatile memory device of FIG. 5.

Referring to FIG. 6, the display device according to the present embodiment may display a pre-scaled image generated by the pre-scaling operation, and may display a transition image generated by the transition operation during a transition period between a first period during which the pre-scaled image is displayed and a second period during which the compensated image is displayed. Accordingly, the flicker due to the loading delay may be reduced or prevented.

Specifically, at the first time point TC1, the power may start to be supplied to the display device 1000, and then initialization operations for driving the display device 1000 may be performed. At the second time point TC2, the pre-scaling data may start to be loaded from the non-volatile memory device 600. Because the pre-scaling data may have a relatively small size (e.g., about 8 bytes), the pre-scaling data may be loaded in a short time. At the third time point TC3, loading of the pre-scaling data is completed, and the pre-scaling operation may start to be performed. At the fourth time point TC4, the initialization operations are completed, and the image may start to be displayed. However, because the loading of the compensation data is not completed at the fourth time point TC4 and the pre-scaling operation is continuously performed, the pre-scaled image may be displayed. At the fifth time point TC5, the loading of the compensation data is completed, and the transition operation may start to be performed. Accordingly, the transition image gradually changing from the pre-scaled image to the compensated image may be displayed during the transition period. Because the speed of change of the transition image can be adjusted according to the difference between the pre-scaled image and the compensated image, the flicker may not be recognized to the user. At the sixth time point TC6, the transition period is over, and the compensated image may be displayed instead of the transition image.

Figure 7:
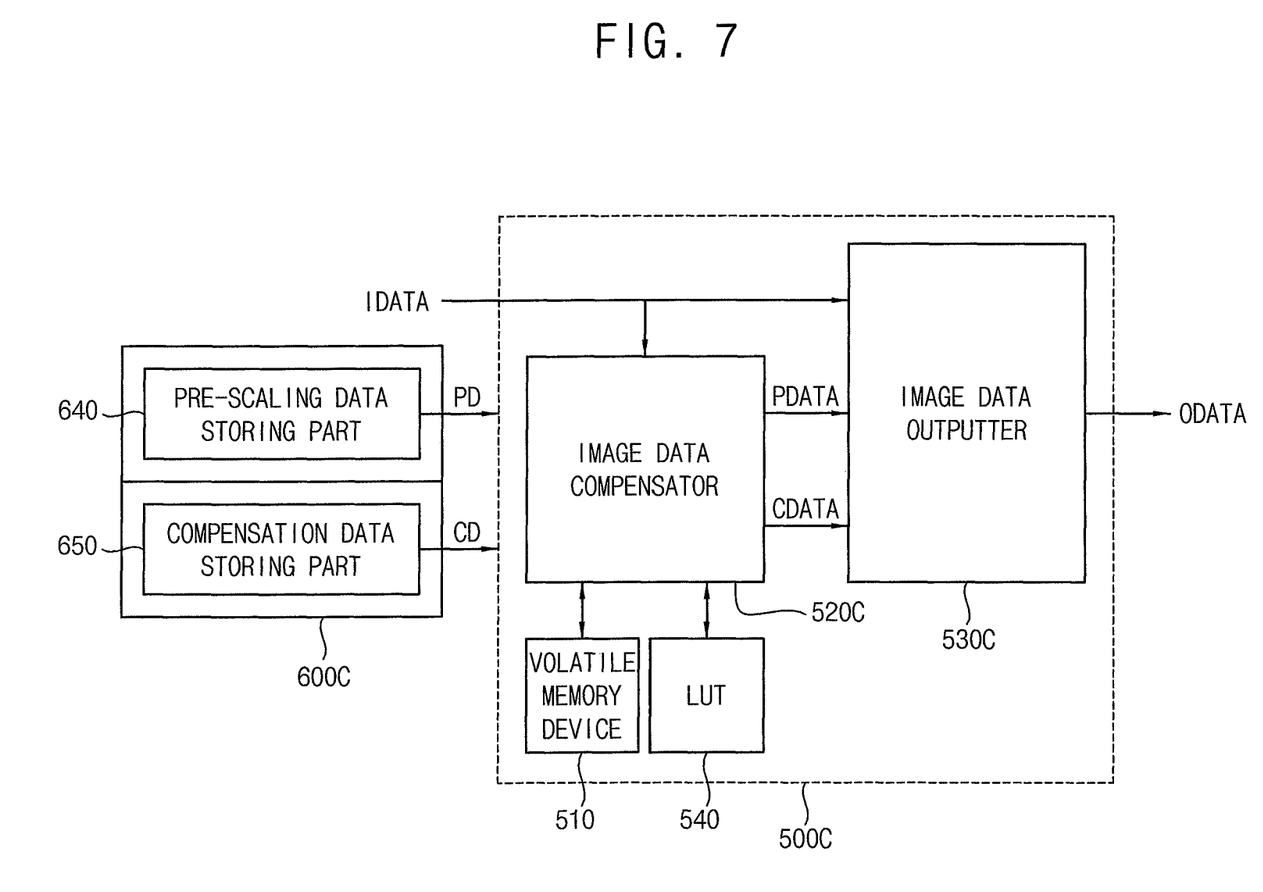
FIG. 7 is a diagram illustrating still another example of a compensator and a non-volatile memory device included in the display device of FIG. 1.

FIG. 7 is a diagram illustrating still another example of a compensator and a non-volatile memory device included in the display device of FIG. 1.

Referring to FIG. 7, the non-volatile memory device 600C may include a pre-scaling data storing part 640 and a compensation data storing part 650. The pre-scaling data PD may be stored in the pre-scaling data storing part 640. The compensation data CD may be stored in the compensation data storing part 650. The compensator 500C may include a volatile memory device 510, an image data compensator 520C, an image data outputter 530C, and a look-up table (LUT) 540. The compensator 500C and the non-volatile memory device 600C according to the present embodiment are substantially the same as the compensator 500A and the non-volatile memory device 600A of the embodiment described in FIG. 2, except that the non-volatile memory device 600C stores the pre-scaling data PD and the compensation data CD, and the compensator 500C further includes the LUT 540. Therefore, the same or like reference numerals will be used to refer to the same or like parts as those described in the previous embodiment of FIG. 2, and any repetitive explanation concerning the above elements will be omitted.

The pre-scaling data PD may be stored in the pre-scaling data storing part 640. Here, the pre-scaling data PD may include at least one of the pre-scaling factor and pre-scaling accumulated data. The pre-scaling accumulated data may be generated based on the accumulated data. In one embodiment, the pre-scaling accumulated data may be set to an average value of the accumulated data. In another example, the pre-scaling accumulated data may be set to a maximum value or a minimum value of the accumulated data.

The compensation data CD may be stored in the compensation data storing part 650. The compensation data CD may include at least one of a deviation correction parameter, the compensation factor, and the accumulated data.

The image data compensator 520C may load the pre-scaling data PD to perform the pre-scaling operation based on the pre-scaling data PD before the compensation factors CF are loaded. In one embodiment, the image data compensator 520C may generate first image data PDATA by multiplying the input image data IDATA by the pre-scaling factor loaded from the non-volatile memory device 600C. In another embodiment, the image data compensator 520C may convert the accumulated data loaded from the non-volatile memory device 600C into the pre-scaling factor using the LUT 540, and may generate first image data PDATA by multiplying the input image data IDATA by the pre-scaling factor.

In addition, the image data compensator 520C may perform the compensation operation based on the compensation data CD after the loading of the compensation data CD is completed. In one embodiment, the image data compensator 520C may load the plurality of compensation factors corresponding to each of the pixels from the non-volatile memory device 600C, and may generate second image data CDATA by multiplying the input image data IDATA corresponding to each of the pixels by the corresponding compensation factor. In another embodiment, the image data compensator 520C may convert the accumulated data loaded from the non-volatile memory device 600O into the compensation factors using LUT 540, and may generate second image data CDATA by multiplying the input image data IDATA corresponding to each of the pixels by the corresponding compensation factor.

The LUT 540 may store a relationship between the accumulated data and the factors (e.g., pre-scaling factor and/or compensation factor). Thus, the pre-scaling accumulated data may be converted into the pre-scaling factor using the LUT 540 to perform the pre-scaling operation. Also, the accumulated data may be converted into the compensation factor using the LUT 540 to perform the compensation operation.

Figure 8:
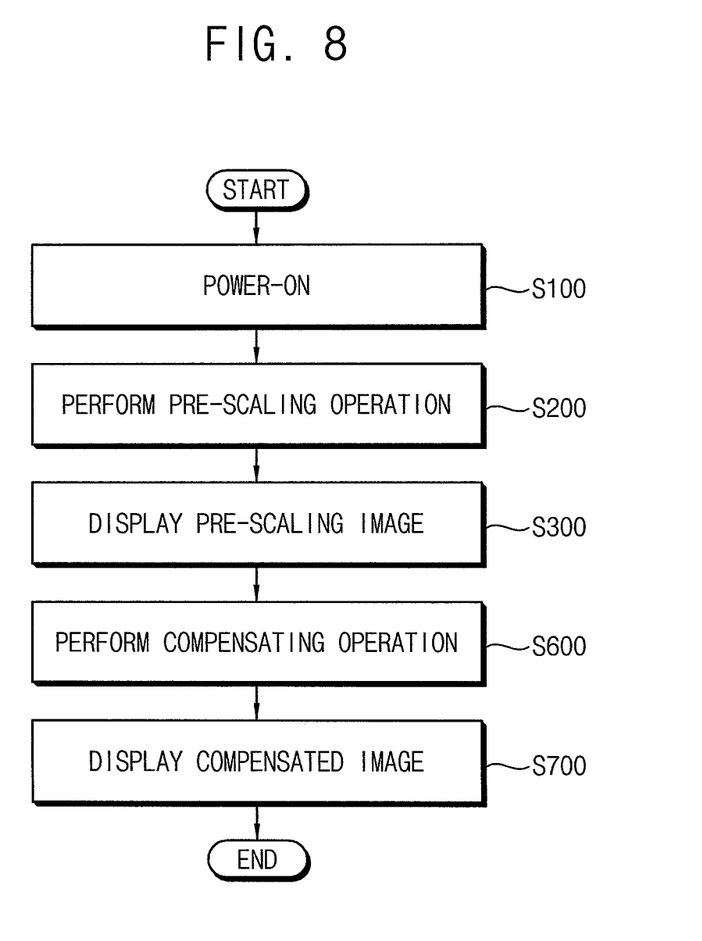
FIG. 8 is a flow chart illustrating a method of driving a display device according to one embodiment.

FIG. 8 is a flow chart illustrating a method of driving a display device according to one embodiment.

Referring to FIG. 8, the power may be supplied to the display device, and then initialization operations of the display device may be performed (S100). For example, the controller may receive the power from the power supply, and may perform the initialization operations for driving the display device, such as loading the initialization data.

The pre-scaling operation for input image data may be performed based on the pre-scaling data to generate first image data (S200). In one embodiment, the pre-scaling operation may load the pre-scaling factor as the pre-scaling data, and may generate first image data by applying a single pre-scaling factor to the input image data corresponding to all of the pixels. In another embodiment, the pre-scaling operation may load pre-scaling factors corresponding to each of the pre-scaling pixel groups, and may generate first image data by applying the corresponding pre-scaling factor to the input image data corresponding to each of the pre-scaling pixel groups. In one embodiment, the compensation data may be generated based on accumulated data that is generated by accumulatively storing the input image data. In one example, the pre-scaling data may be set to an average value of the compensation data. Because a method of performing the pre-scaling operation is described above, duplicated descriptions will be omitted.

The pre-scaled image corresponding to the first image data may be displayed until the loading of the compensation data is completed (S300). When the loading of the compensation data is completed, the compensation operation for the input image data may be performed based on the compensation data to generate second image data (S600). In one embodiment, the compensation operation may load a plurality of compensation factors corresponding to each of the pixels as the compensation data, and may apply the compensation factors to the input image data corresponding to each of the pixels, respectively, to generate the second image data. In another embodiment, the compensation operation may load a plurality of compensation factors corresponding to each compensation pixel group as the compensation data, and may apply the compensation factors to the input image data for each compensation pixel group, respectively, to generate the second image data. Because a method of performing the compensation operation is described above, duplicated descriptions will be omitted.

The compensated image corresponding to the second image data may be displayed (S700). Therefore, despite of the loading delay of the compensation data, the flicker phenomenon can be reduced or avoided, and the display quality can be improved because the pre-scaled image is changed to the compensated image.

Figure 9:
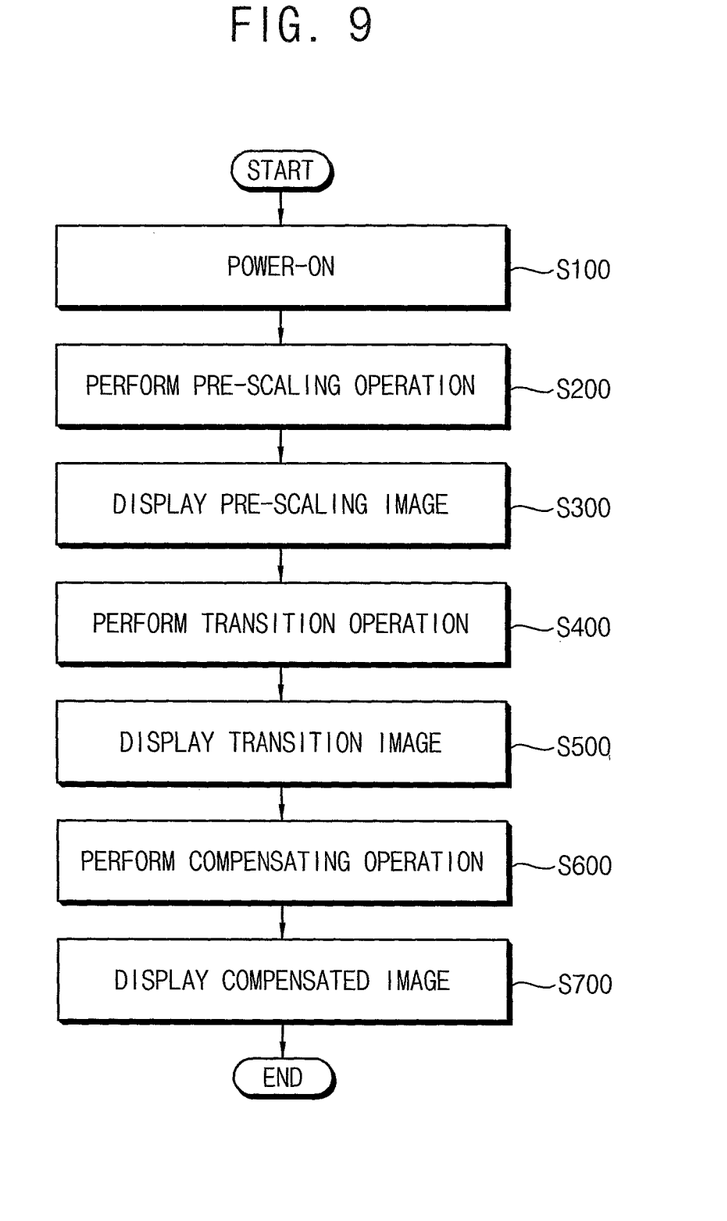
FIG. 9 is a flow chart illustrating a method of driving a display device according to another embodiment.

FIG. 9 is a flow chart illustrating a method of driving a display device according to another embodiment.

Referring to FIG. 9, the transition operation is performed between the pre-scaling operation and the compensation operation, thereby further reducing the flicker phenomenon. The method of driving the display device according to the present embodiment is substantially the same as the method of driving the display device of the embodiment described in FIG. 8, except for the addition of operations (S400) and (S500) of performing a transition operation and displaying a transition image. Therefore, the same reference numerals will be used to refer to the same or like parts as those described in the previous embodiment of FIG. 8, and any repetitive explanation concerning the above elements will be omitted.

The power may be supplied to the display device, and then initialization operations of the display device may be performed (S100).

The pre-scaling operation for input image data may be performed based on the pre-scaling data to generate first image data (S200).

The pre-scaled image corresponding to the first image data may be displayed before the transition period (S300).

The transition operation may be performed during the transition period such that the pre-scaled image gradually changed to the compensated image (S400). The third image data corresponding to the transition image may be determined or calculated to be between the first image data and the second image data. In one embodiment, the third image data may correspond to a gradual change from the first image data to the second image data during the transition period during which the transition operation is performed. Because a method of performing the tradition operation is described above, duplicated descriptions will be omitted.

The transition image corresponding to the third image data may be displayed during the transition period after the loading of the compensation factors is completed (S500).

The compensation operation for the input image data may be performed based on the compensation data to generate second image data (S600).

After the transition period is over, the compensated image corresponding to the second image data may be displayed (S700).

Although the embodiments describe that the compensator compensates the pixel deterioration using the accumulated data, it is not limited thereto. For example, the deviation correction parameters between the pixels derived from the optical sensor may be stored in the non-volatile memory, and then the compensator may perform a pre-scaling operation before the loading of the deviation correction parameters is completed, such that the deviation correction parameters may be for performing the deviation correction operation.

Although the display device and the method of driving the display device according to embodiments have been described with reference to the figures, those skilled in the art will readily appreciate that many modifications are possible in the embodiments without materially departing from the novel teachings and aspects of the present embodiment. For example, although the embodiments describe that the display device is the organic light emitting display device, a type of the display device is not limited thereto.

The described embodiments may be applied to an electronic device having the display device. For example, the present embodiment may be applied to a laptop computer, a mobile phone, a smart phone, a smart pad, a PMP, a PDA, an MP3 player, a digital camera, a video camcorder, The foregoing is illustrative of embodiments and is not to be construed as limiting thereof. Although a few embodiments have been described, those skilled in the art will readily appreciate that many modifications are possible in the embodiments without materially departing from the novel teachings and aspects of the described embodiments. Accordingly, all such modifications are intended to be included within the scope of the present inventive concept as defined in the claims, functional equivalents thereof to be included. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims and their functional equivalents.

What is claimed is:

1. A display device comprising:
a display panel comprising a plurality of pixels;
a memory device configured to store pre-scaling data and compensation data; and
a panel driver configured to:
generate first image data by performing a pre-scaling operation on input image data based on the pre-scaling data;
generate second image data by performing a compensation operation on the input image data based on the compensation data; and
provide a driving signal to the pixels to display a pre-scaled image corresponding to the first image data, or to display a compensated image corresponding to the second image data,
wherein the pre-scaling operation is performed only during a period after a power-on operation of the display device starts and before a loading of the compensated image is-completed, the pre-scaling operation beginning before, yet ending after, the display panel starts to display an image as a result of the power-on operation.

2. The display device of claim 1, wherein the compensation data are generated based on accumulated data generated by accumulatively storing the input image data, and
wherein the pre-scaling data are generated based on the compensation data.

3. The display device of claim 2, wherein the pre-scaling data are set to an average value of the compensation data.

4. The display device of claim 2, wherein the pre-scaling data are set to a maximum value of the compensation data or to a minimum value of the compensation data.

5. The display device of claim 1, wherein the pre-scaling operation loads a pre-scaling factor for all of the pixels as the pre-scaling data, and applies the pre-scaling factor to the input image data to generate the first image data.

6. The display device of claim 5, wherein the compensation operation loads a plurality of compensation factors for the pixels as the compensation data, and applies the compensation factors to the input image data for each of the pixels, respectively, to generate the second image data.

7. The display device of claim 6, wherein the panel driver is configured to:
drive the display panel based on the first image data until the compensation factors are loaded; and
drive the display panel based on the second image data after the compensation factors are loaded.

8. The display device of claim 1, wherein the panel driver is configured to perform a transition operation for determining third image data corresponding to values between the first image data and the second image data, and
wherein a transition image corresponding to the third image data is displayed during a transition period between a first period during which the pre-scaled image is displayed and a second period during which the compensated image is displayed.

9. The display device of claim 8, wherein the third image data are gradually changed from the first image data to the second image data during the transition period.

10. The display device of claim 8, wherein a time length of the transition period increases as a difference between the first image data and the second image data increases.

11. The display device of claim 1, wherein the pre-scaling operation loads a plurality of pre-scaling factors for each of a plurality of pre-scaling pixel groups comprising respective ones of the pixels as the pre-scaling data, and applies the pre-scaling factors to the input image data for each of the pre-scaling pixel groups, respectively, to generate the first image data.

12. The display device of claim 11, wherein the compensation operation loads a plurality of compensation factors for each of a plurality of compensation pixel groups comprising respective ones of the pixels as the compensation data, and applies the compensation factors to the input image data for each of the compensation pixel groups, respectively, to generate the second image data.

13. The display device of claim 12, wherein a first number of the pixels of one of the pre-scaling pixel groups is larger than a second number of the pixels of one of the compensation pixel groups.

14. The display device of claim 11, wherein the first image data are generated by performing an interpolation operation on the pre-scaling factors at a boundary of one of the pre-scaling pixel groups.

15. The display device of claim 1, wherein, when the compensation data are updated, the pre-scaling data are updated based on the updated compensation data.

16. A method of driving a display device to improve display quality thereof, the display device comprising a memory device for storing pre-scaling data and compensation data, the method comprising:
performing a pre-scaling operation for input image data based on the pre-scaling data to generate first image data;
displaying a pre-scaled image on the display device corresponding to the first image data;
performing a compensation operation for the input image data based on the compensation data to generate second image data; and
displaying a compensated image on the display device corresponding to the second image data,
wherein the pre-scaling operation is performed only during a period after a power-on operation of the display device starts and before a loading of the compensated image is completed, the pre-scaling operation beginning before, yet ending after, a display panel of the display device starts to display an image as a result of the power-on operation.

17. The method of claim 16, wherein the compensation data are generated based on accumulated data generated by accumulatively storing the input image data, and
wherein the pre-scaling data are generated based on the compensation data.

18. The method of claim 17, wherein the pre-scaling data are set to an average value of the compensation data.

19. The method of claim 16, further comprising:
performing a transition operation for determining third image data between the first image data and the second image data; and
displaying a transition image corresponding to the third image data during a transition period between a first period during which the pre-scaled image is displayed and a second period during which the compensated image is displayed.

20. The method of claim 19, further comprising gradually changing the third image data from the first image data to the second image data during the transition period.

* * * * *